Patented Jan. 20, 1942

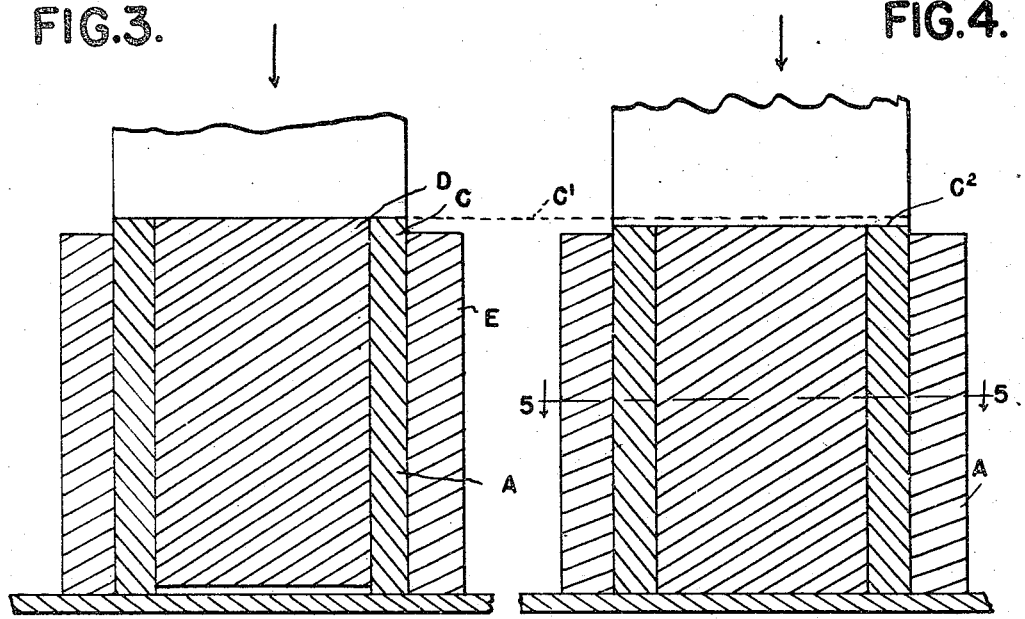
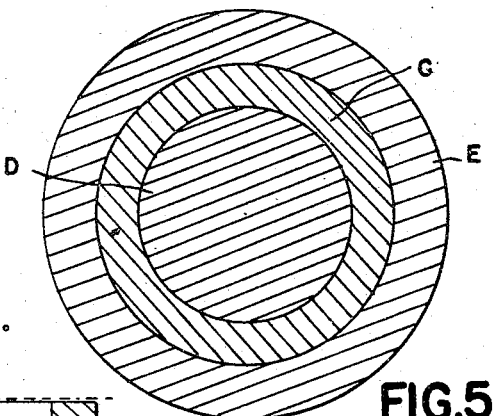
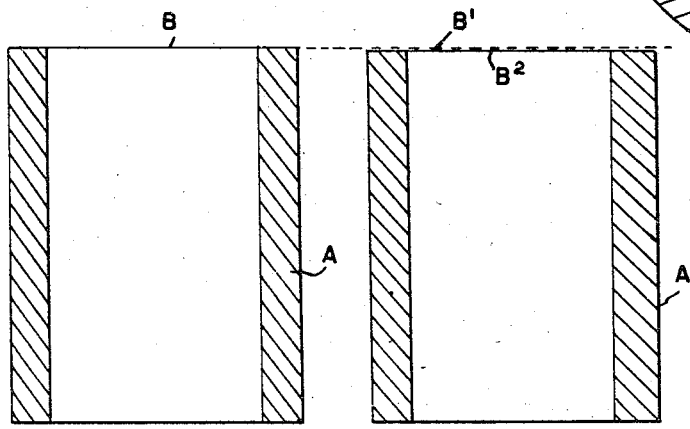

2,270,486

UNITED STATES PATENT OFFICE 2,270,486

PROCESS OF FABRICATING LEADED BRONZE BEARING SHELLS

Albert B. Willi, Grosse Pointe, Mich., assignor to Federal-Mogul Corporation, Detroit, Mich., a corporation of Michigan Application August 23, 1939, Serial No. 291,613

3 Claims. (Cl. 29—149.5)

This invention relates to a preferred process of treating sand-cast bronze bearing shells now so extensively used in internal combustion engine construction and analogous installations, and has for its object the production of a bearing shell which, despite the variances in the co-efficients of expansion of bronze and of the ferrous housing saddle, makes it possible to associate the two in a manner and to such a degree that, once assembled, they function accurately and indefinitely without the necessity of frequent change or replacement.

It is well known that even when the best shaft-engaging bearing surface is employed, such as a Babbitt coating, for the shaft-engaged interior face of a bearing, even this would rapidly burn out under the heat generated by the frictional rotation of the shaft therewithin, were it not for the conduction away of the heat to a very appreciable degree by the immediately surrounding shell of bronze, and, outside of that, by the ferrous housing saddle. But in order for this to be accomplished reliably and efficiently, it is necessary that the fit of the bronze bearing shell within the ferrous saddle be at all times complete and effective, without even seemingly infinitesimal spacings therebetween. If any looseness of fit develops between the back of the bearing shell, that is to say, its outer or convex surface, and the supposedly similarly curved concaved surface of the housing saddle, a film of oil will soon be formed therein; and this is an effective insulator and prevents rapid heat dissipation.

This condition has to be taken into consideration whether the bearing shell be a fully circular one or composed of two mated half-bearings, held together by compressive bolts through the housing saddle. It is well-known practice to make these half-bearing shells somewhat in excess of 180° size, so that before being subjected to this bolt-effected compressive action, their edges will project slightly above those of the ferrous saddle. In each kind, however, two factors must be borne in mind: the heating influence of the shaft's rotation upon the several layers, babbitt, bronze and the ferrous housing saddle; and the mechanical effect due to the more or less rolling action of the rotating shaft's surface upon the surrounding bearing.

In the case of mated half bearings, since the compressive strength of the sand-cast bronze is comparatively low, it frequently happens that, when the two halves of a bearing are bolted together, the force required to accomplish this, in addition to compressing the bearing circumferentially, which it is supposed to do, as well imparts a permanent set thereto from which the bronze shell does not recover, and eventually under the surface-rolling action of the rotating shaft the bearing loosens in its seat, particularly in the vicinity of the edges of the other half-bearing. In contrast with this, the superior physical properties of a steel back insure a much larger degree of recovery from compression; it does not take a permanent set when the bearing units are bolted together, and there is little likelihood of the bearing loosening up in its seat. And since the coefficient of expansion of any ferrous material is so much lower than that of bronze, when heat is generated by the shaft's rotation, the tendency of the bronze shell is to expand more rapidly and to a greater extent than the ferrous saddle. If the housing structure is sufficiently rigid, the bronze back bearing can not expand and the expansive energy exerts itself in the direction of compressing the bronze. Consequently when the engine or machine cools off, the bronze contracts relatively rapidly and the bearing is found to be loose in its seat. This results in an actually slight but really injurious termination of its hitherto complete back contact with the concave surface of the ferrous housing saddle, and a film of oil makes its way into the space, with the result that the conductivity of the heat away from the Babbitted shaft-engaging surface is very objectionally reduced. But the use of a steel-backed bearing makes it possible to use a thinner wall, giving a lighter weight bearing as compared with that of a bearing which, except for its Babbitted shaft-engaging surface, is of bronze, to say nothing of the question of relative cost. Hence the desirability of finding some means of effectively uniting the bronze and ferrous parts against separation due to their remarked-upon variant heat-responsive rates of expansion and contraction.

In the case of fully circular, one-piece bearing shells, there are of course no meeting edges of the half-bearing shells whose possible inbending and resultant separation from the ferrous housing must be guarded against. But the unbrokenly circular lining is similarly subject to both the wiping effect and the heating effect of the shaft's rotative action, and as the heated bronze unit cools off more rapidly than its surrounding ferrous shell, its by then compressed mass tends to draw away from the ferrous housing member, and this is accentuated by the next ensuing rolling or wiping action of the rotating shaft upon it; and the previously complete contact between the convex or outer face of the bronze part and the concave or inner face of the ferrous shell is succeeded by the resultantly developed spacings, which, even though they be of very slight actual depth, suffice to end the desired, indeed necessary, heat-conductive contact of the two parts.

Of course experience has long dictated the selective use of various and variously proportioned alloy constituents for a bronze bearing shell, according to the particular intended circumstances of use, but for the purposes of the present disclosure, let it be assumed that the bronze castings used have at least a nine per cent lead content. Of course, the higher the lead content, the more malleable and easily distorted the bearing proves to be, and past a certain point this will afford an exaggerated instance of the objectionable difficulties which have heretofore been encountered in the efficient association of bronze bearing shells and ferrous housing saddles. Such sand-cast bronze units being comparatively soft, are capable, even when cool, of being compressed as regards their constituent mass, to the degree of overcoming a large part of the initial sponginess of the metal structure as such; and this treatment as well imparts a degree of rigidity to the bronze bearing shell similarly approaching, though not equal to, that of the ferrous housing saddle.

Since the calculated wall thickness of the bearing shell is necessarily a matter of such fine dimensions that it can not be well reduced by the exertion of pressure upon the interior face of the bearing shell, with of course its outer or convex surface suitably backed up, I resort, for the purpose of densifying the metal, to the expedient of applying a compressive or squeezing pressure lengthwise of the axis of the bearing upon the semi-circular, or circular, bronze bearing shell walls, to a degree which effects a reduction of about three per cent from its initial linear extent. Allowance having been made in the size of the original sand-castings for this ultimate reduction in the length of the individual shells, the resultant semi-circular, or completely circular, bronze bearing shell is then of a length satisfactorily corresponding with the desired linear length of the completed bearing, and the constituent metal has been densified and as well made so much more rigid that its permanent fit within the ferrous housing saddle is assured, despite the heating influence of the rotating shaft, first of course upon the Babbitted lining, but thereafter into and through the bronze bearing shell and the ferrous housing saddle. It has been my experience that a compressive action, though of relatively short duration, similar to that of a notary's seal when impressed upon a sheet of paper, rather than an impact compressive action is preferable, though with both sides, concave and convex, of the bearing shell suitably reinforced by a pillow block or the like against buckling, an impact action might be equally effective, and I desire the scope of this disclosure to be understood as covering either or both.

Figures 1 and 2 of the drawing illustrate respectively the full length and the compression-reduced length of a bearing shell after the treatment thereof by the exertion of lengthwise compression, the top edge B of the shell A being continued in dotted line from B' above the reduced top edge B² of the shell after compression, to indicate the three per cent diminution in its net length after reduction thereof, either by impact or by squeezing pressure.

Figures 3 and 4 are similar sectional elevational views of a shell member C which has been reinforced internally by a filler block D and externally by a surrounding shell E, so that when impact or squeezing pressure is applied from above, as indicated by the arrows, no buckling of the walls of the shell can occur. As in the case of Figures 1 and 2, the top edge line of the bearing shell C has been continued in a dotted line C', which, being slightly spaced from the top edge C² of the reduced length bearing shell, is intended to be illustrative of the three per cent diminution in the axial length thereof resulting from the compression.

Figure 5 is a sectional plan view taken along the line 5—5 of Figure 4, and looking in the direction of the arrows there shown, designed to emphasize the desired tightness of the fit of the filler block within the bearing shell and of the enclosing member E within which it is fitted previous to the application of the compressive force.

What I claim is:

1. The process of harmonizing the initially variant coefficients of expansion of a ferrous bearing housing and of a cast bronze journal bearing designed to be held therein, comprising the subjection of the latter to compressive action exerted upon its wall in a direction parallel to its axis of curvature, whereby, incident to the resultant diminution of the bearing unit's length to a degree in excess of three per cent the component metal is densified accordingly.

2. The process of preparing a pre-cast bronze journal bearing unit against heat-induced severance from full heat-transmissive contact with a ferrous housing saddle despite the initial variance of the coefficient of expansion of the former as contrasted with the latter, comprising the subjection of such unit to compressive action exerted lengthwise of its axial extent to a degree resulting in a lessening of its length of not less than three per cent.

3. The process of insuring the permanent structural association of a pre-cast bronze bearing shell and its ferrous housing despite their initially variant degrees of responsiveness to heat-induced expansion, which consists in subjecting the bronze shell to compressive action, exerted lengthwise of its axial extent, of a degree adequate to effect a reduction of more than three per cent of its initial length, thus densifying its component metal accordingly, preliminary to its lodgment within the ferrous housing.

ALBERT B. WILLI.